(12) United States Patent
Bujak et al.

(10) Patent No.: US 7,834,617 B2
(45) Date of Patent: Nov. 16, 2010

(54) MAGNETORESISTIVE CONTINUOUS SEAT TRACK POSITION SENSOR

(75) Inventors: Chris Bujak, New Baltimore, MI (US); Manoharprasad K. Rao, Novi, MI (US); Tor Von Eichwald, Sweden (SE)

(73) Assignee: Ford Global Technologies, LLC, Dearborn, MI (US)

( * ) Notice: Subject to any disclaimer, the term of this patent is extended or adjusted under 35 U.S.C. 154(b) by 402 days.

(21) Appl. No.: 12/017,475

(22) Filed: Jan. 22, 2008

(65) Prior Publication Data

US 2009/0184708 A1 Jul. 23, 2009

(51) Int. Cl.
*G01B 7/14* (2006.01)
*G01R 33/09* (2006.01)
*H01L 43/08* (2006.01)

(52) U.S. Cl. ............................. 324/207.24; 324/207.21

(58) Field of Classification Search .............. 324/207.2, 324/207.21, 207.24, 207.25, 174, 207.22; 280/735
See application file for complete search history.

(56) References Cited

U.S. PATENT DOCUMENTS

| | | | |
|---|---|---|---|
| 4,401,944 A * | 8/1983 | Narimatsu et al. ..... | 324/207.21 |
| 5,967,549 A | 10/1999 | Allen et al. | |
| RE37,466 E * | 12/2001 | Allen et al. ................. | 280/735 |
| 6,411,081 B1 * | 6/2002 | Spellman ............... | 324/207.21 |
| 6,854,782 B2 | 2/2005 | Reichert et al. | |
| 6,921,107 B2 * | 7/2005 | Mills et al. .................. | 280/735 |
| 7,005,848 B2 | 2/2006 | Suzuki et al. | |
| 7,009,386 B2 * | 3/2006 | Tromblee et al. ........ | 324/207.2 |
| 7,411,387 B2 * | 8/2008 | Yamada ................. | 324/207.24 |
| 2004/0100388 A1 | 5/2004 | Yoshida et al. | |
| 2004/0251723 A1 | 12/2004 | Endo et al. | |
| 2009/0121708 A1 * | 5/2009 | Lackey .................... | 324/207.2 |

* cited by examiner

*Primary Examiner*—Kenneth J Whittington
(74) *Attorney, Agent, or Firm*—Franklin MacKenzie; Ford Global Technologies, LLC

(57) ABSTRACT

A magnetoresistive continuous seat track position sensor system to determine longitudinal movement of the seat along a length of a track is described. In one embodiment, the system comprises a magnetic array in a fixed position and having a width and a length along the seat track length. The array is equipped with a plurality of magnets arranged along the length of the array. The magnets have a polarity oriented at an angle θ relative to each other. The system further includes a magnetoresistive sensor in spaced apart close proximity to the magnetic array. In one embodiment, the magnetoresistive sensor is movable relative to the array. Movement of the sensor relative to the array creates a sensor signal indicative of the longitudinal position of the seat in the track to control auxiliary safety features.

20 Claims, 3 Drawing Sheets

MAGNETORESISTIVE CONTINUOUS SEAT TRACK POSITION SENSOR

BACKGROUND OF THE INVENTION

The present invention relates a magnetoresistive continuous seat track position sensor to determine longitudinal position of the seat in the vehicle. The signal generated thereby is communicated to a restraint control module, wherein, with additional input from other safety system sensors, the action of auxiliary safety devices such as air bags and seat belt pretentioners can be controlled in crash events. The magnetoresistive continuous seat track position sensor of the present invention is understood to be a safety system for vehicles.

BRIEF SUMMARY OF THE INVENTION

The present invention is a magnetoresistive continuous seat track position sensor system to determine longitudinal movement of the seat along a length of a track. Preferably, the seat is mounted in a vehicle, such as an automobile. The system includes a magnetic array in a fixed position and having a width and a length along said seat length; said array equipped with a plurality of magnets arranged along the length of said array; each said magnet having a polarity oriented at an angle θ relative to each other; and a magnetoresistive sensor in spaced apart close proximity to said magnetic array; said magnetoresistive sensor movable relative to said array; movement of the sensor relative to the array creates a sensor signal indicative of the longitudinal position of said seat in said track to control auxiliary safety features.

The auxiliary safety features include seat belt pretension system and vehicle occupant air bag systems. The safety system further includes a restraint control module to receive data signal input from said magnetoresistive sensor to control vehicle seatbelt pretensioner systems and vehicle occupant air bag systems. The safety system further includes input data signals to the restraint control module from remote crash sensors, seatbelt buckle switches and occupant classification sensors to control the seatbelt pretensioners and vehicle occupant air bag systems.

In one embodiment, the sensor signal output varies as a function of the sine/cosine of the angle of direction of the magnetic field polarity with respect to the magnetoresistive sensor. For example, in one embodiment, the sensor signal varies from a relatively high voltage low angle of direction of the magnetic field to a relatively low voltage, high angle of direction of the magnetic field. In another embodiment, the sensor signal outputs varies as a function of the sine/cosine of the angle of direction of the magnetic polarity from a relatively low voltage high angle of direction of the magnetic field to a relatively high voltage low angle of direction of the angle of direction of the magnetic field. In one embodiment, the voltage ranges from about 0.25 volts to about 4.75 volts. While voltages may be shown in analog, it is possible to use the digital equivalents of those analog ranges. When at low voltage the seat is at a first position, and at high voltage, the seat is at a second position.

The magnets are arranged along the length of the array at an angle θ proximal and distal to the midpoint of the length of the array. In other words, the angle of the polarity begins as an acute angle at one end of the array, and each angle of polarity of the next magnet is at a slightly different acute angle until the midpoint of the array is reached, at which point the magnet's direction of polarity is perpendicular to the length of the array. Thereafter, the magnets are arranged at slightly greater obtuse angles until the opposite end of the array. The magnetoresistive sensor signal output varies as the sine and/or cosine of the angle of direction of the magnetic field up to 360 degrees. The longitudinal position of the seat along the array is determined according to a linear relationship between voltage and seat position along the said array.

DETAILED DESCRIPTION OF THE INVENTION

Figure 1:
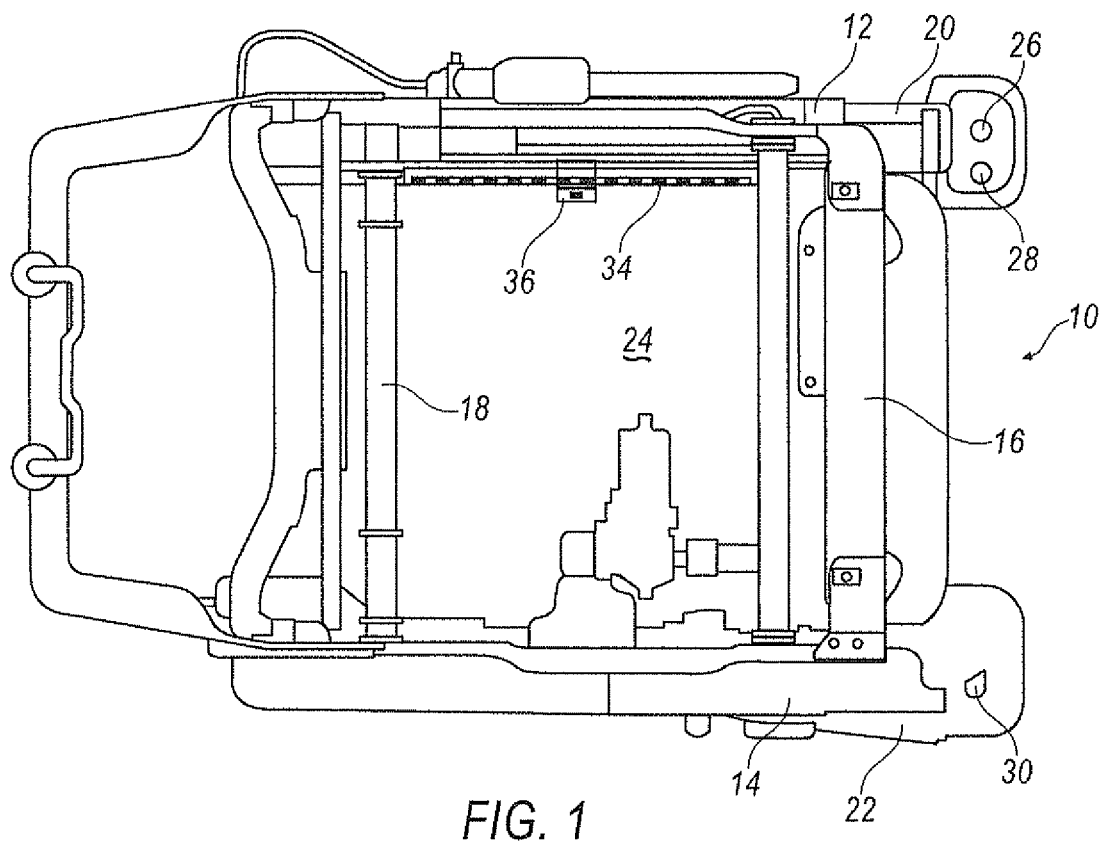
FIG. 1 is a schematic representation of a vehicle seat frame equipped with an array and a magnetoresistive sensor.

Turning now to the drawings wherein like numbers refer to like structures, FIG. 1 is a detailed plan view of a seat frame useful in one embodiment of the present invention. Vehicle seat 10 is comprised of lateral, spaced apart frame members 12, 14, respectively, spaced apart by cross members 16 and 18, respectively. The seat is arranged to move longitudinally in seat tracks 20, 22, adapted to be mounted in a vehicle floor 24 by attachments through apertures 26, 28, and 30, respectively. It is apparent that while one method of mounting the vehicle seat to the vehicle floor is illustrated, any manner of attaching the seat track to the floor is contemplated in the description of the invention. The tracks are substantially parallel to each other and serve to permit the seat to travel to different positions longitudinally within a vehicle compartment.

Along at least one of the seat tracks, or at least in close proximity to the seat track and substantially parallel to the seat track, a magnetic array 34 is positioned relative to the seat and may be mounted either in the track, or adjacent the track. The seat is equipped with a magnetoresistive sensor 36, mounted on at least one of the seat lateral frame members in close proximity to the magnetic array 34. Since the array is affixed in position relative to the frame, the movement of the seat causes the magnetoresistive sensors to move longitudinally relative to the array and thereby sense changes in voltage caused by the change of direction in polarity of the individual magnets in the array as will be discussed in reference to FIGS. 3A and 3B.

Figure 2:
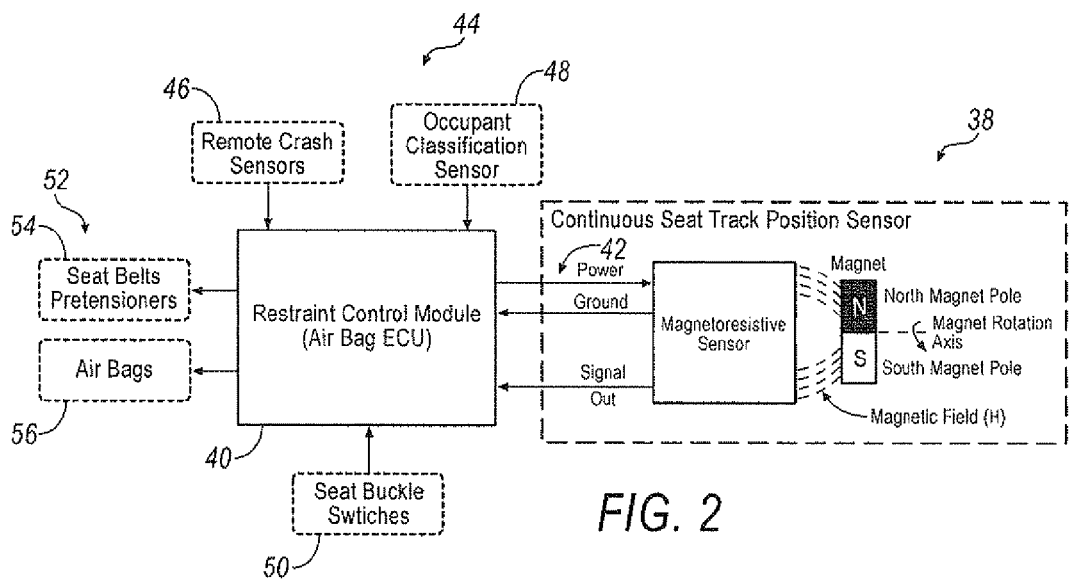
FIG. 2 is a schematic overview of a safety system according to the present invention.

Turning now to FIG. 2, there is shown a seat track electrical schematic depicting the overview of the safety system attendant with one aspect of the present invention. Specifically, system 38 is comprised of the magnetic array, the magnetoresistive sensor which, together with the seat, forms the continuous seat track position system as described in reference to FIG. 1. The magnetoresistive sensor is electrically connected to a remote electronic control unit (ECU), which may be a restraint control module 40, or it could be the vehicle ECU, or could be any ECU. The restraint control module may supply the magnetoresistive sensor with power as indicated at 42, and the magnetoresistive sensor sends a signal indicative of the longitudinal position of the vehicle seat within a vehicle compartment to the restraint control module. The restraint control module receives additional data signals from safety input devices 44, shown here as remote crash sensors 46, occupant classification sensors 48 and seat belt buckle switches 50. The restraint control module has a memory that may be volatile and nonvolatile, EPROM, EEPROM, Flash or any other memory, with tables resident therein wherein values for controlling auxiliary safety devices 52, shown as seat belt pretensioners 54 and air bags 56. It is extremely important that all occupant information be made available to the restraint control module so that all the safety devices work together to enhance occupancy safety. For example, it is important to know the longitudinal position of a vehicle seat within a vehicle so that the air bags are inflated at the proper rate and intensity to provide maximum protection to the occupant in the seat. The input of additional data from the remote crash sensors, occupant classification sensors, and seat belt buckle switches all enhance the operation of the seat belt pretensioner or air bag during vehicle crash events. Values may be stored in the restraint control module tables indicative of various intensities and rates of activation for these devices based upon input to the restraint control modules, including longitudinal seat position within a vehicle during a crash event.

Figure 3A:
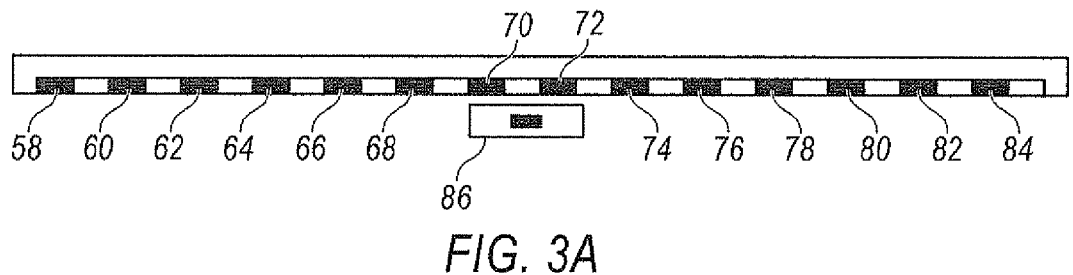
FIG. 3A is a top view of a magnetic array and magnetoresistive sensor arrangement useful in the present invention.

FIG. 3A is a representation of a top view of the magnetic array and magnetoresistive sensor. Specifically, the magnetic array is comprised of a plurality of magnets 58, 60, 62, 64, 66, 68, 70, 72, 74, 76, 78, 80, 82 and 84, respectively, arranged on the array. The array preferably has a length greater than its width. The magnetoresistive sensor is mounted in a sensor holder 86, that maintains the sensor in close proximity to the array as it is positioned relative to the array during longitudinal seat movement.

Figure 3B:
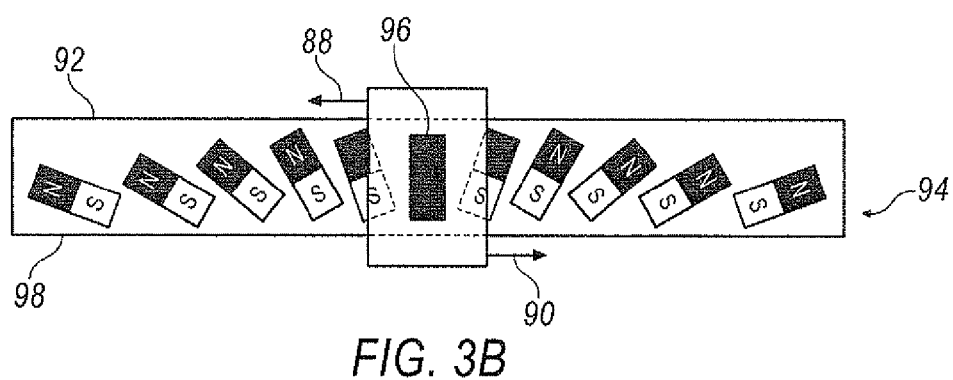
FIG. 3B is a side view of the magnetic array and magnetoresistive sensor of FIG. 3A.

FIG. 3B is a side view of the magnetic array and magnetoresistive sensor showing the relative direction or polarity of the individual magnets in the array and the direction of travel 88, 90 for the magnetoresistive sensor. Specifically, each magnet in the array is arranged so that the magnetic poles of the magnets are aligned at a relative angle θ with respect to each other. FIG. 3B represents an embodiment of the present invention, which corresponds to an angle of 15 degrees for the relative angle theta. In this regard, the angle of direction of polarity is an acute angle at a first end 94 of the array, and gradually, each magnet's angle of polarity changes by the value θ relative to the adjacent magnet until at a point substantially midpoint 96 of the array, the magnet is perpendicular to the longitudinal direction of travel of the vehicle seat. Thereafter, the magnets are arranged along the array at progressively greater obtuse angles toward the array end 98.

Figure 4:
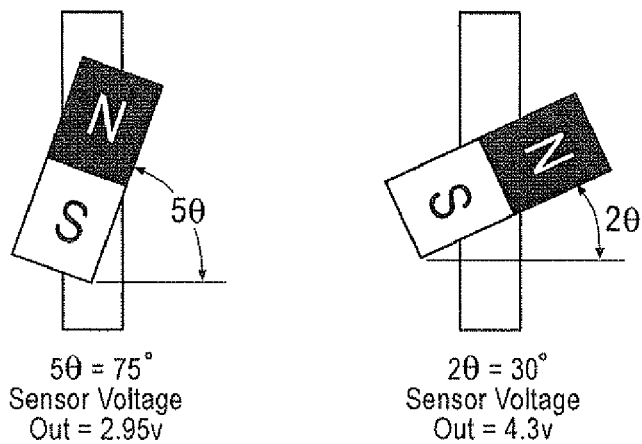
FIG. 4 is a detailed representation of magnets in the array of FIGS. 3A and 3B showing the orientation of the direction of polarity between magnets.

As stated earlier, the magnetoresistive sensor senses the direction of polarity of the magnets along the array and generates a voltage that is a signal indicative of the longitudinal relative position of the seat in the vehicle compartment relative to the track. FIG. 4 is a representation of two magnets in the array at different angles to indicate that changes in the angle of polarity changes the voltage produced when the magnetoresistive sensor senses the direction of polarity of the magnets in the array. As can be seen, when the angles of polarity direction is high, (i.e., 75°) the voltage generated is relatively low (i.e., 2.95 volts), and when the angle is low, (i.e., 30°) the voltage generated is relatively high (i.e., 4.3 volts), The changes in voltage as the magnetoresistive sensor travels relative to the array generates signals to the restraint control module indicative of the longitudinal position of the seat in a vehicle. Those skilled in the art will recognize that a high angle could yield a low voltage and a low angle could yield a high voltage. The referenced voltages and angles are set forth for illustrative purposes only.

Figure 5:
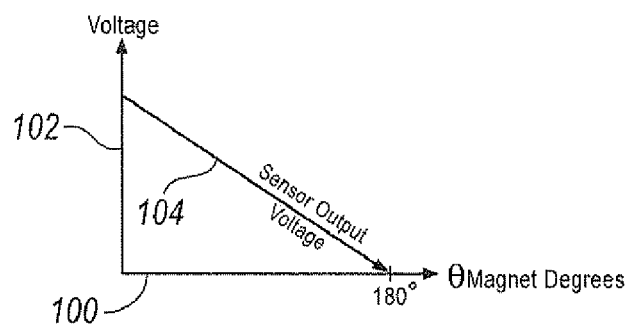
FIG. 5 is a graph depicting the magnetoresistive sensing performance of system comparing sensor voltage output to direction of orientation of magnets in the array.

FIG. 5 is a graphic representation of a magnetoresistive sensing performance of one aspect of the present invention. The x axis 100 is the angle of direction of polarity for the magnets arranged along the array, and the y axis 102 is voltage. Note that in this example, the sensor signal output 104 varies as a function of the sine/cosine of the angle of direction of the magnetic field polarity at relatively high voltage low angle of direction of the polarity of the magnetic field to a relatively low voltage, high angle of direction of the magnetic field. It is understood that FIG. 5 is an illustrative example, at it is possible that the sensor signal output could vary as a function of the sine/cosine of the angle of direction of the magnetic field polarity at a relatively low voltage, high angle of direction of the magnetic field to a relatively high voltage, low angle of direction of the polarity of the magnetic field.

Figure 6:
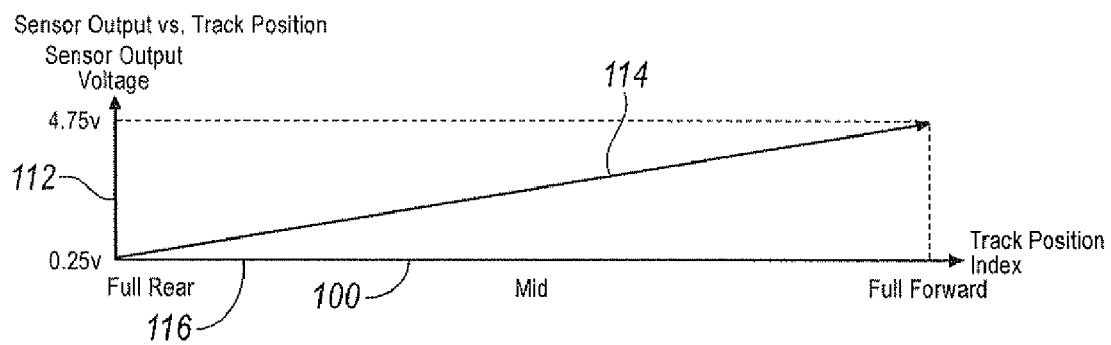
FIG. 6 is a graph showing magnetoresistive sensor output versus seat position in the track.

FIG. 6 is a representation of the magnetoresistive seat track position in relation to voltage of the signal produced. The x axis 110 is longitudinal seat position, ranging from full rear to full forward position of the seat, and the y axis 112 is sensor output voltage. The relationship between longitudinal seat position and voltage is depicted at 114, and can be understood to be linear. When the seat is in the rearward portion 116, the voltage is relatively low, and as the seat travels longitudinally toward the full forward position 118, the voltage is relatively high. In this depiction, the voltage ranges from 0.25 volts to 4.75 volts, but any range of voltages may be seen, the only limitation being that the relationship between longitudinal seat position and voltage is linear.

While one embodiment has been described, it is apparent that the words used are not words of limitation, but rather words of description. Many variations and modifications are possible without departing from the scope and spirit of the invention as set forth in the appended claims.

What is claimed as new and desired to be protected by Letters Patent of the United States is:

1. A magnetoresistive continuous seat track position sensor system to determine longitudinal position of the seat along a length of a track; comprising:
   a magnetic array in a fixed position and having a width and a length along said seat track length; said array equipped with a plurality of magnets arranged along the length of said array, the plurality of magnets including three or more magnets; each said magnet having a polarity oriented at an angle θ relative to each other; whereby the polarity of each of the magnets has an orientation relative to a line segment defined by said length, the orientation relative to the line segment being different for each magnet than the orientation to the line segment for any of the other magnets; and
   a magnetoresistive sensor in spaced apart close proximity to said magnetic array; said magnetoresistive sensor movable relative to said array; movement of the sensor relative to the array creates a sensor signal indicative of the longitudinal position of said seat in said track to control auxiliary safety features.

2. The system of claim 1, wherein said auxiliary safety features include seat belt pretension system and vehicle occupant air bag systems.

3. The system of claim 1, further including a restraint control module to receive data signal input from said magnetoresistive sensor to control vehicle seatbelt pretensioner systems and vehicle occupant air bag systems.

4. The system of claim 3, further including input data signal to the restraint control module from remote crash sensors, seatbelt buckle switches and occupant classification sensors to control said seatbelt pretensioners and said vehicle occupant air bag systems.

5. The system of claim 1, wherein the sensor signal output varies as a function of the sine/cosine of the angle of direction of the magnetic field polarity at relatively high voltage, low angle of direction of the polarity of the magnetic field to a relatively low voltage, high angle of direction of the polarity of the magnetic field.

6. The system of claim 5, wherein said voltage ranges from about 0.25 volts to about 4.75 volts.

7. The system of claim 5, wherein at low voltage the seat is in a first position, and at high voltage, the seat is in a second position.

8. The system of claim 5, wherein the longitudinal position of said seat has a linear relationship between voltage and seat position along said array.

9. The system of claim 1, wherein the sensor signal output varies as a function of the sine/cosine of the angle of direction of the magnetic field polarity at relatively low voltage, high angle of direction of the polarity of the magnetic field to a relatively high voltage, low angle of direction of the polarity of the magnetic field.

10. The system of claim 9, wherein said voltage ranges from about 0.25 volts to about 4.75 volts.

11. The system of claim 9, wherein at low voltage the seat is in a first position, and at high voltage, the seat is in a second position.

12. The system of claim 9, wherein the longitudinal position of the seat has a linear relationship between voltage and seat position along said array.

13. The system of claim 1, wherein said magnets arranged along the length of the array are oriented at an angle $\theta$ proximal and distal to a midpoint of the array.

14. A magnetoresistive continuous vehicle seat position sensor system to determine a relative longitudinal position of a vehicle seat movably mounted in a fixed vehicle seat track; said system comprising:
a vehicle seat having a frame with special apart substantially parallel lateral frame members slidably engageable with fixed, spaced apart substantially parallel seat tracks adaptable to be mounted to a vehicle floor; said seat longitudinally moveable along said seat track in a first direction and second direction; a magnetic array having a length greater than a width; said array mounted in fixed position relative said seat track, said array equipped with a plurality of magnets arranged along said length, the plurality of magnets including three or more magnets, each said magnet having a polarity oriented at an angle $\theta$ relative to each other, whereby the polarity of each of the magnets has an orientation relative to a line segment defined by said length that, the orientation relative to the line segment being different for each magnet than the orientation relative to the line segment for any of the other magnets, a magnet at a midpoint of said array being oriented perpendicular to said array; pairs of said magnets being oriented in equal and opposite angles to said array at substantially equal distances from a midpoint of the array; and a magnetoresistive sensor mounted on said seat frame in close relation to said fixed magnetic array; whereby movements of the sensor relative to the array creates a sensor signal receivable by a restraint control module to determine relative seat position within the vehicles to control auxiliary passenger safety devices.

15. The system of claim 14, wherein said auxiliary safety devices include seatbelt pretensioners and air bags.

16. The system of claim 14, further including input to said restraint control module by remote crash sensors, seatbelt buckle switches, and occupant classification sensors.

17. The system of claim 14, wherein the magnetoresistive sensor signal output varies as a function of the sine/cosine of the angle of direction of the magnetic field at relatively high voltage, low angle of direction of the polarity of the magnetic field, to a relatively low voltage, high angle of direction of the polarity of the magnetic field.

18. The system of claim 14, wherein the magnetoresistive sensor signal output varies as a function of the sine/cosine of the angle of direction of the polarity of the magnetic field at relatively low voltage, high angle of direction of the polarity of the magnetic field, to a relatively high voltage, low angle of direction of the polarity of the magnetic field.

19. The system of claim 14, wherein at low voltage the seat is in a first position, and at high voltage, the seat is in a second position, said position of the seat has linear relationship between voltage and seat position along said array.

20. The system of claim 14, wherein the longitudinal position of said seat has a linear relationship between voltage and seat position along said array.

* * * * *